Dec. 26, 1950      H. R. SCIVALLY      2,535,096
WELL LOGGING RECORDER

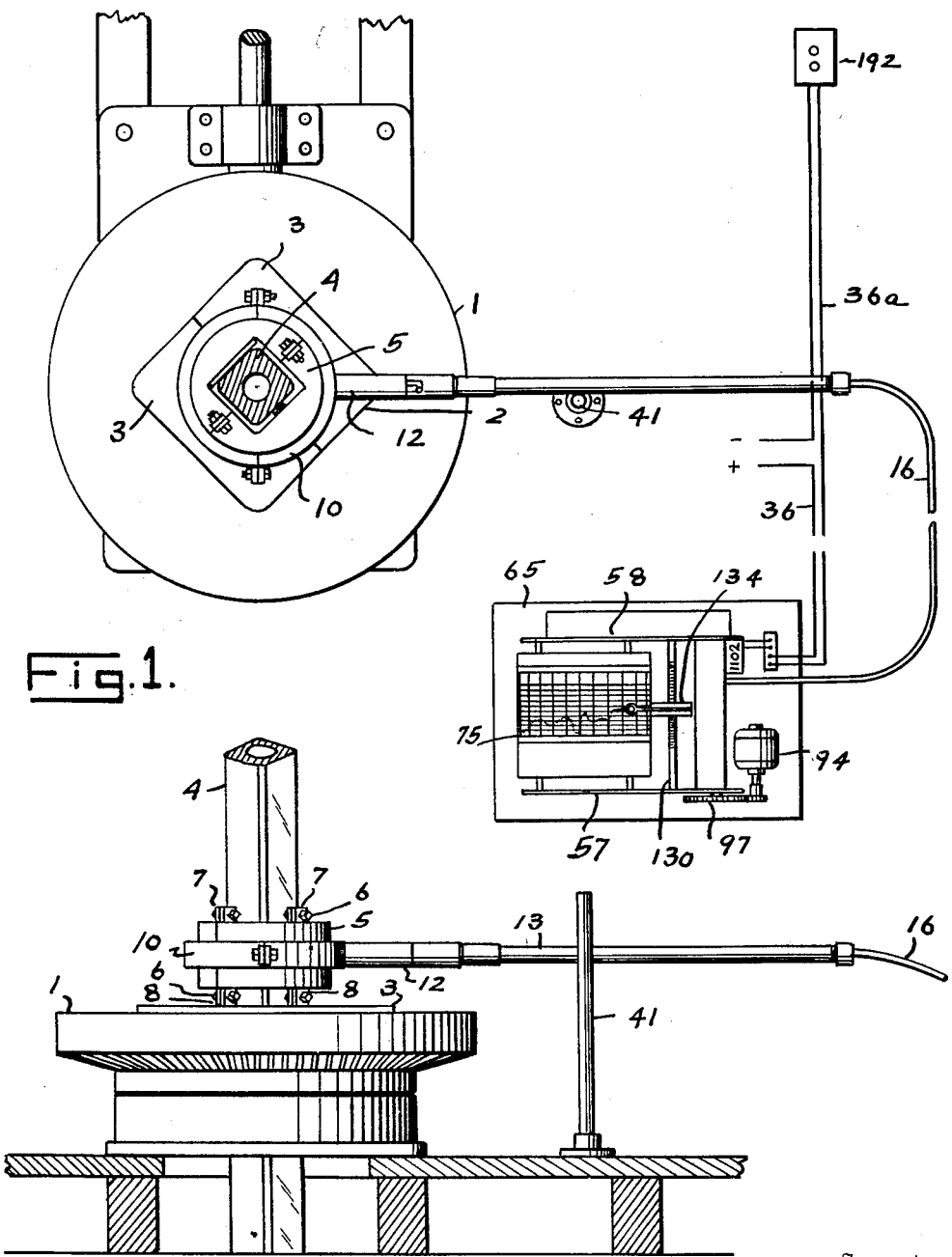
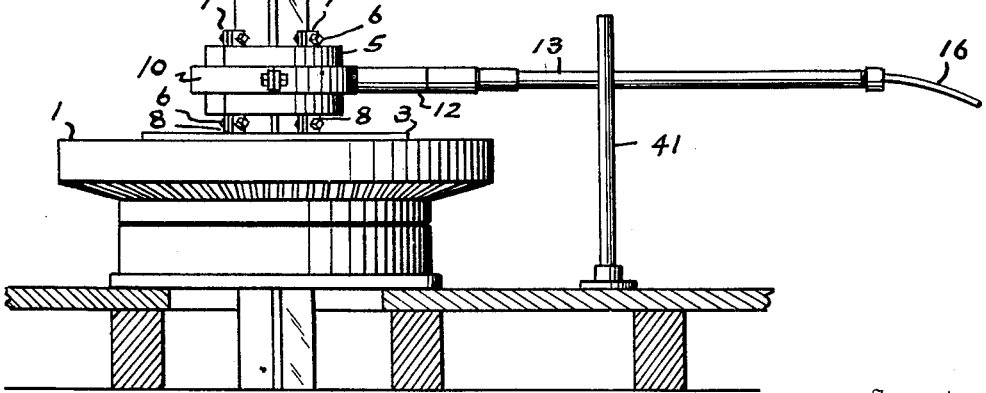

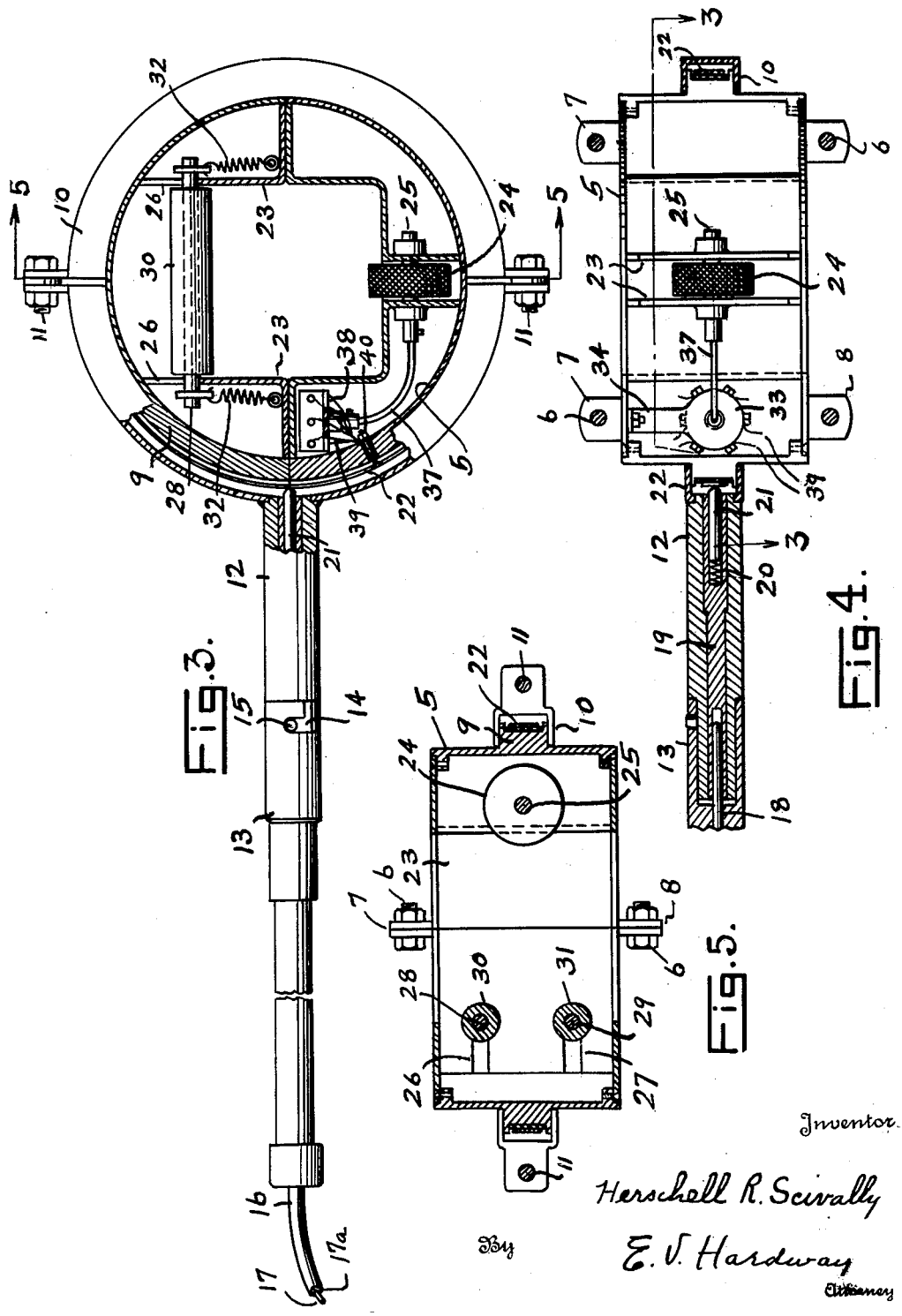

Filed Aug. 23, 1946      8 Sheets-Sheet 3

Inventor
Herschell R. Scivally
By
E. V. Hardway
Attorney

Dec. 26, 1950   H. R. SCIVALLY   2,535,096
WELL LOGGING RECORDER
Filed Aug. 23, 1946   8 Sheets-Sheet 4

Inventor
Herschell R. Scivally
By E. J. Hardway
Attorney

Dec. 26, 1950　　　H. R. SCIVALLY　　　2,535,096
WELL LOGGING RECORDER

Filed Aug. 23, 1946　　　8 Sheets-Sheet 5

Inventor
Herschell R. Scivally
By E. V. Hardway
Attorney

Dec. 26, 1950 — H. R. SCIVALLY — 2,535,096
WELL LOGGING RECORDER
Filed Aug. 23, 1946 — 8 Sheets-Sheet 6

Inventor
Herschell R. Scivally
By E. V. Hardway, Attorney

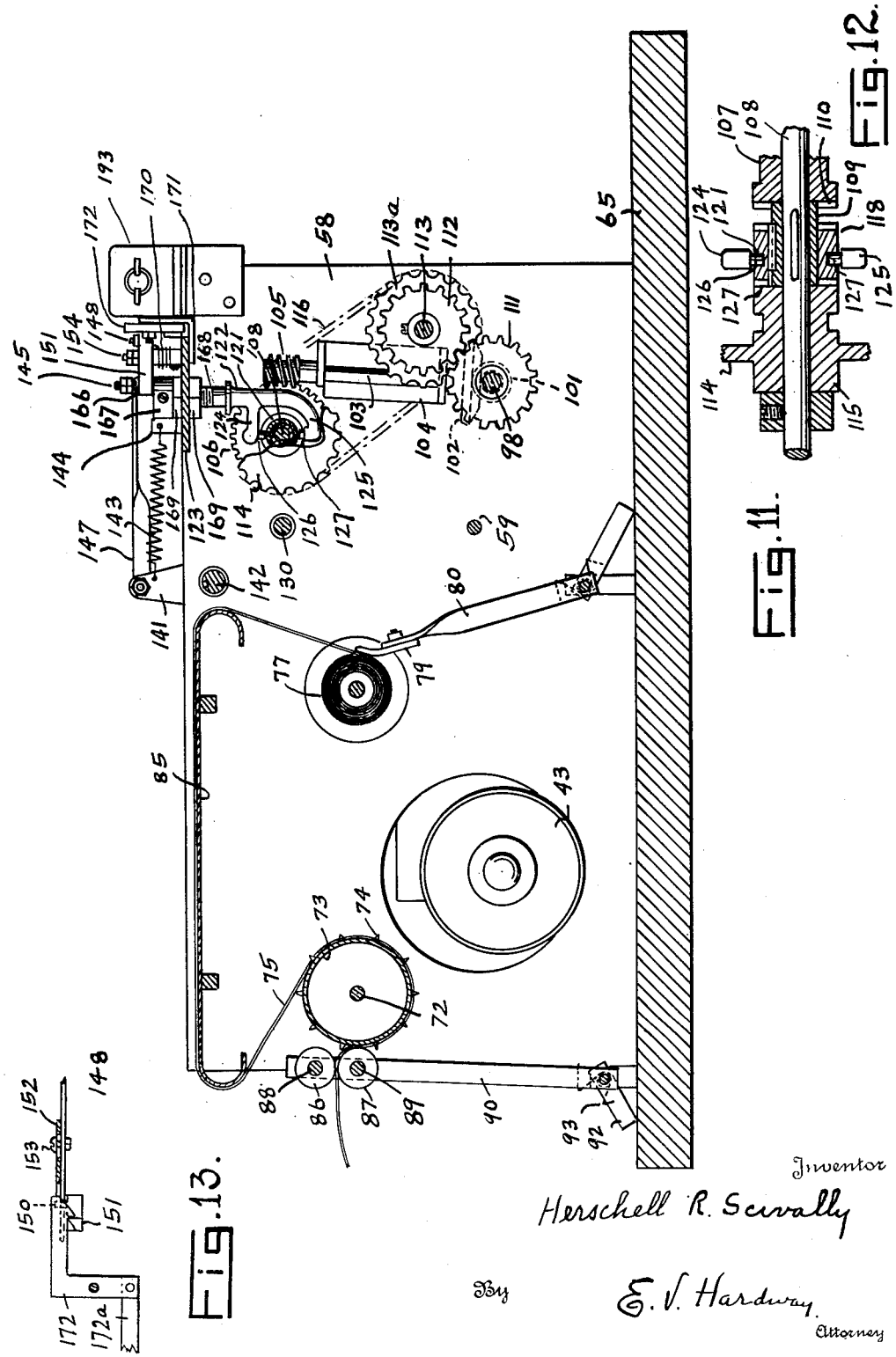

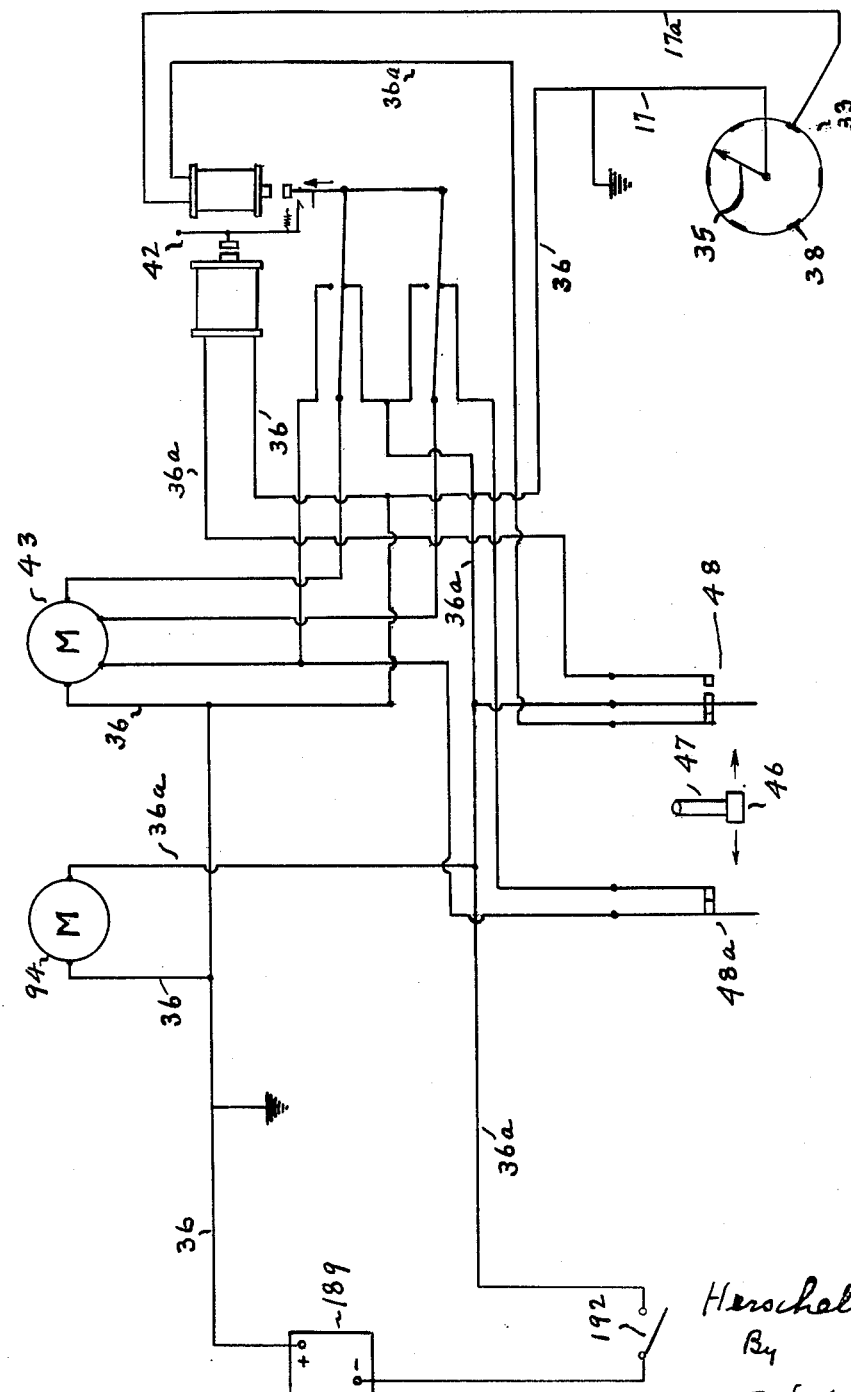

Patented Dec. 26, 1950

2,535,096

UNITED STATES PATENT OFFICE 2,535,096

WELL LOGGING RECORDER

Herschell R. Scivally, Shreveport, La.

Application August 23, 1946, Serial No. 692,503

5 Claims. (Cl. 346—39)

This invention relates to a well logging machine.

An object of the present invention is to provide a machine of the character described adapted to be used in conjunction with a rotary drilling machine for the purpose of producing a record of the relative densities of the various strata encountered by the drill in drilling a well.

It is another object of the present invention to provide a machine of the character described which will be operated by the drill stem to which the drill is attached and which will produce a record, or log, of the rate of the downward progress of the drill through the strata encountered and will thus provide visible data which will indicate the relative hardness, that is the resistance offered the drill, of the various strata pierced by the drill as the drilling progresses. A graphic record to scale will thus be produced so that the character of the log so obtained may be identified and correlated from one well to another well and from area to area.

The invention also relates to a novel method of well logging whereby the relative hardness of the formation encountered by the drill during the progress of drilling will be graphically recorded to scale for the purpose hereinabove indicated.

Other objects and advantages will be apparent from the following specification which is illustrated by the accompanying drawings, wherein:

Figure 1 is a plan view of a rotary drilling machine showing the drill stem in cross-section and the recording mechanism associated therewith.

Figure 2 is a side view of the rotary drilling machine showing the driving means for the recording mechanism associated therewith.

Figure 3 is an enlarged plan view, partly in section, taken on the line 3—3 of Figure 4, of the driving means.

Figure 4 is a vertical, cross-sectional view, thereof.

Figure 5 is a cross-sectional view thereof taken on the line 5—5 of Figure 3.

Figure 11 is a longitudinal, sectional view taken on the line 11—11 of Figure 6.

Figure 12 is an enlarged fragmentary sectional view of the reversing clutch assembly.

Figure 13 is a fragmentary front elevation of the latch for the clutch mechanism, and Figure 14 is a diagrammatic view of the wiring circuits.

Figure 6:
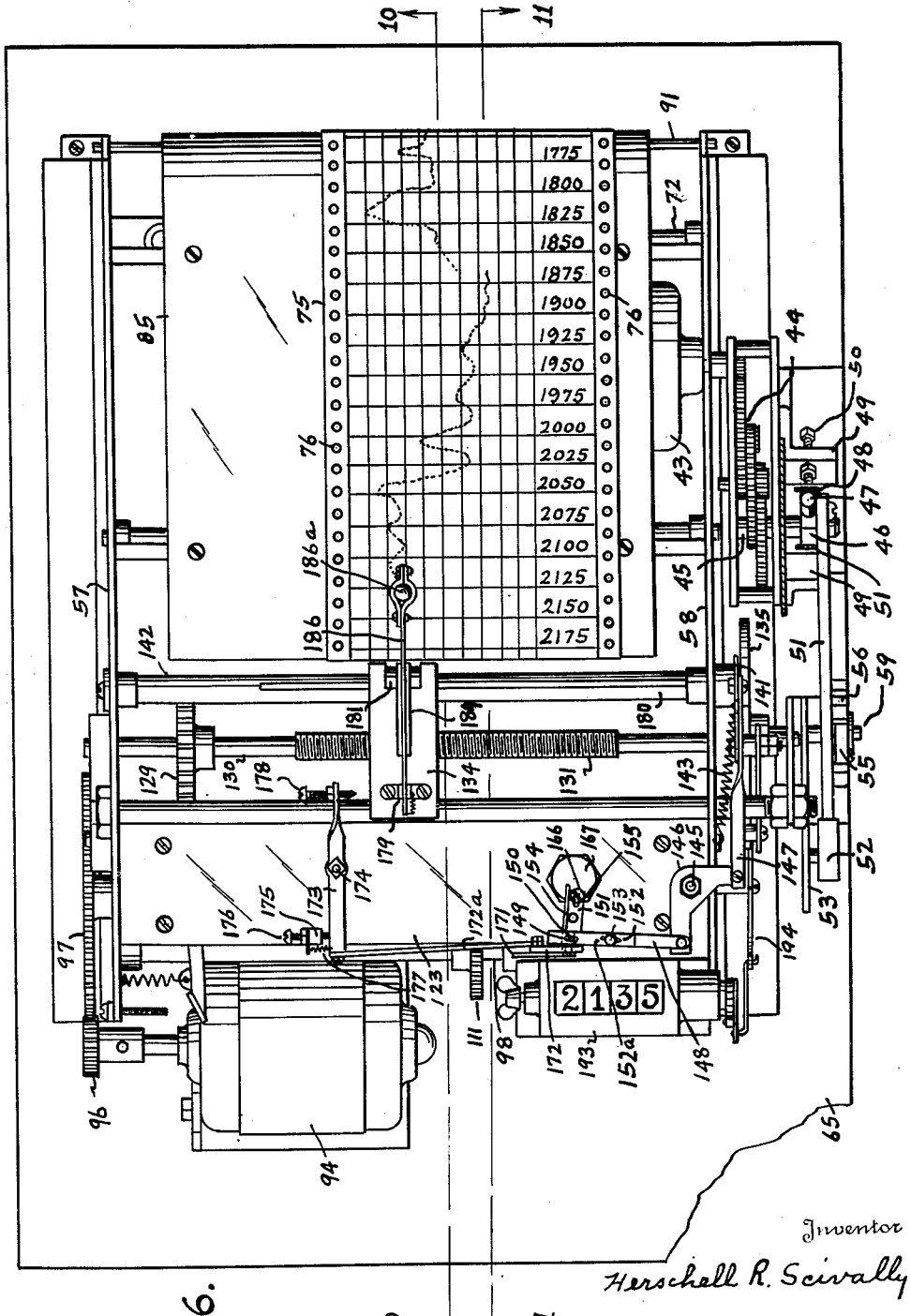
Figure 6 is a plan view of the recording mechanism with the cover removed.

Referring now more particularly to the drawings wherein like numerals of reference designate the same parts in each of the figures, the numeral 1 designates the rotary table of a conventional rotary drilling machine. The upper face of the table 1 has a polygonal recess 2, which is preferably square to receive the sections 3, 3 of the driving bushing which fits around and drives the tubular Kelly joint 4 forming the upper end of the conventional drill stem. Attached to the lower end of the drill stem is a drill of any conventional construction. The drill and the drill stem proper have not been shown in the drawings for the reason that they are of conventional construction and well known to those familiar with the drilling art.

It may be here stated that the recording mechanism may be operatively connected with the drill stem kelly, or driving section, either at the beginning of drilling operations or after the well has reached any desired depth.

There is a collar 5 which is composed of two similar sections and which is clamped around the kelly by means of bolts 6 which extend through the registering upstanding ears 7, 7 and similar depending ears 8, 8. This collar has a vertical opening therethrough which is square in cross-section and is of sufficient size to allow the kelly 4 to move up and down therethrough in a vertical direction during drilling operations. The collar 5 is supported on the drive bushing sections 3, 3.

As indicated in Figures 4 and 5, the collar 5 has an external annular rib 9 therearound and an annular yoke 10 is clamped around the collar 5 and is fitted over said rib. It is formed of sections whose ends are outwardly turned and secured together by means of the clamp bolts 11, as best shown in Figures 1 and 2 and 3. Secured to this yoke there is a radially extended tubular anchor 12 to which a tubular extension arm 13 is attached. The inner end of this arm is fitted over the outer end of the anchor 12, as best shown in Figure 4, and is provided with a J-slot 14 for the reception of an outwardly extended pin 15, carried by the anchor and thus providing means for the convenient attachment of the arm 13 to, and its detachment from, the anchor 12.

Extending through the arm 13 there is a cable 16 carrying two eelctrical conductors 17, 17a one of which is grounded on the arm 13 and the other of which is electrically connected with an insulated plug 18. This plug 18 projects into a bore in the outer end of a core 19 in the anchor 12 and is in electrical connection therewith, and yieldingly mounted on a coil spring 20 in a bore in the other end of said core there is a carbon brush 21 which is held, by the spring 20, in contact with a copper band 22 which is insulated from and which extends entirely around the collar 5 in an annular external recess in the external annular rib 9 of said collar 5.

Within, and extending across, the collar 5 are the transverse, vertical plates 23, 23 which are spaced apart a sufficient distance to allow the kelly 4 to pass between them. At one side of the kelly these plates are spaced only a sufficient distance apart to receive the measuring wheel 24 between them, as best shown in Figures 3 and 4. The surface of this wheel is knurled so as to prevent slippage between it and the kelly, against one flat face of which the wheel 24 is in contact. The wheel 24 is fixed on a stub shaft 25 which rotates in suitable bearings in the side plates 23. On the opposite side of the collar 5 the plates 23 are provided with the upper and lower slots 26, 27 in which the ends of the respective upper and lower shafts 28, 29 are mounted to slide. Fixed on these shafts between said plates are the upper and lower friction rollers 30 and 31 which ride against a flat face of the kelly opposite the knurled wheel 24. The rollers 30, 31 are held in contact with the kelly by means of the pull springs, such as 32, 32, and which are connected at their outer ends to the corresponding ends of the shafts 28, 29 and at their inner ends to said side plates 23, 23 whereby the knurled measuring wheel 24 will be held firmly against the kelly joint 4 and will be rotated by it, as drilling progresses and the drill stem descends.

The numeral 33 designates, as a whole, a commutator which, as shown in Figure 4, is secured to, but insulated from, the collar 5 by means of a bracket 34. This commutator is provided with an electrically grounded rotary brush 35 to which the electrical conductor 17 is connected. The brush is rotated by means of a flexible shaft 37, one end of which is connected thereto and whose other end is connected to the stub shaft 25. In the present illustration the commutator is shown as having a number of electrically interconnected segments 38 which are spaced an equal distance apart therearound and with which the brush 35 successively contacts. In the present illustration six of these contacts are shown. Thus six electrical impulses occur for each revolution of the measuring wheel 24 since the brush 35 completes an electrical circuit each time the brush comes into contact with a segment 38. These segments, or contacts, 38 are electrically connected with the copper band 22 by means of electrical conductors 39 which, in turn, are connected to a common conductor 40 connected to said band 22 and extending through, but insulated from, the wall of the collar 5.

As the rotary table and drill stem turn the collar 5 and the band 22 will correspondingly rotate but the yoke 10 will be held stationary, the arm 13 engaging against a fixed post 41 upstanding from the derrick, as best shown in Figures 1 and 2.

The electrical circuit through the band 22 is closed when the rotary brush 35 touches one of the contacts 38 in the commutator, said circuit continuing from the "ground" which is any uninsulated part of the measuring collar 5 to the brush 35, contact 38, band 22, carbon brush 21, thence to the core 19, plug 18 and thence to one of the electrical conductors 17 thus causing an electrical circuit to be completed to the recorder.

As previously stated the downward movement of the kelly 4 is reflected by the electric impulses transmitted by the commutator 33. In the particular illustration the knurled measuring wheel 24 is six inches in circumference and the electrically interconnected spaced segments on the commutator 33, being six in number, there is one electric impulse to each inch of downward movement of the drill stem. These impulses are transmitted to a latch type, double pole, double throw relay 42 in the recorder, which serves as a reversing switch in the circuit of the motor 43. When the master coil of the relay 42 has been energized the armature of said relay is raised and maintained in that position thus completing the electrical circuit through said motor 43 and starting said motor. Thereupon the reduction gearing 44, operatively connected with said motor, will be driven and the shaft 45 of said gearing will be oscillated in a clockwise direction. Fixed on this shaft there is an arm 46 which will be correspondingly oscillated in a clockwise direction. The upper end of this arm terminates in a knob 47 and during said movement of said arm this knob 47, which is insulated from said arm, will strike a flexible arm of the single pole, double throw limit switch 48, which switch is normally closed on one pole completing the circuit to the master coil of relay 42. On contact of knob 47 with said flexible arm the circuit to the master coil is open and the circuit on the latch coil of the relay 42 will thus be closed allowing the armature of the relay to drop to its normal position. The electrical contacts will thus be closed completing a circuit for the counter-clockwise movement of the arm 46 thereby reversing the motor 43. The range of movement of the arm 46 will be limited by the spaced brackets 49, one of which is provided with an adjusting screw 50 which may be adjusted to vary said range of movement. The reversal of the motor 43 causes the arm 46 to move in a counter-clockwise direction causing the insulated knob 47 to strike the flexible arm of the limit switch 48a, which is normally closed, and resulting in breaking of the circuit through the motor 43 thus stopping the motor and allowing the arm 46 to come to rest against the bracket 49 in which position it remains with the limit switch 48a open until another electric impulse is transmitted by the commutator 33 to the master coil of relay 42. Thus the cycle of movement of the arm 46 is completed from left to right and returned regardless of the time consumed in the rotary brush of commutator 33 passing over one of the spaced contacts 38.

There is a connecting rod 51, one end of which is pivotally connected to the arm 46 and whose other end is slidably connected to a bracket 52 which, in turn, is fastened to the forwardly extended plate 53 which is, in turn, fastened to the auxiliary side frame 54.

Pivotally mounted on the connecting rod 51 there is a pawl 55 which is arranged to engage with, and turn, the ratchet wheel 56 as the connecting rod oscillates.

The recording mechanism has a framework which includes the vertical side plates 57 and 58 to the latter of which the auxiliary side frame is attached.

The ratchet wheel 56 is fixed on the outer end of the shaft 59 which, in turn, is mounted to rotate in suitable transversely aligned bearings in the vertical frame plates 57, 58 of the main frame. One cycle of movement of the arm 46 pulls the ratchet 56 in a clockwise direction and a distance of one tooth and returns the pawl into position to engage the subsequent tooth. There being twelve teeth on the ratchet 56, in the present illustration, and since one cycle of movement of the arm 46 is caused by the electric impulses from the commutator 33 which occur with each inch of downward movement of the kelly then twelve cycles of movement of the arm 46 effect a complete revolution of the shaft 59, that is to say with each foot of downward movement of the kelly, or drill stem, 4 of the shaft 59 will perform one complete revolution. The shaft 59 is suitably mounted in the framework against endwise movement thereof.

Figure 10:
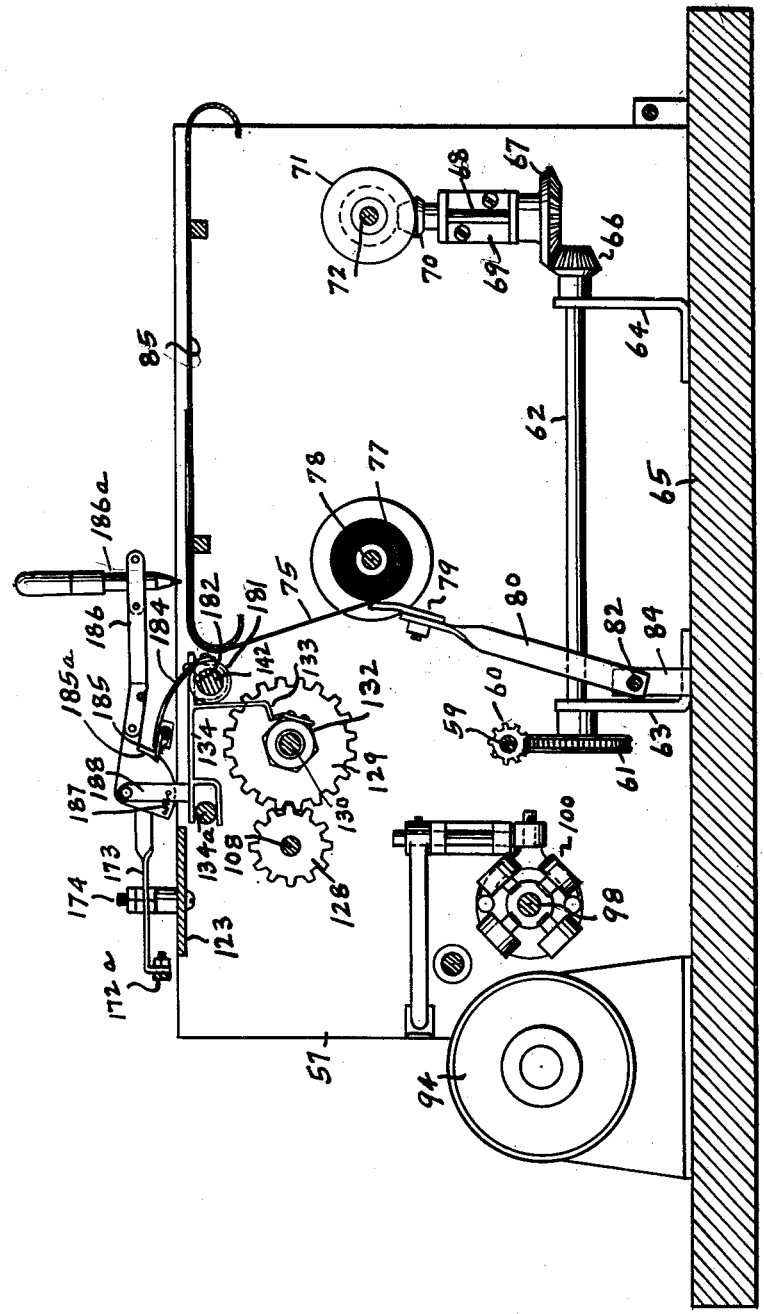
Figure 10 is a longitudinal, sectional view taken on the line 10—10 of Figure 6.

As best shown in Figure 10, there is a pinion 60 fixed on the shaft 59 which is in mesh with, and drives, a worm gear 61 which is fixed on the forward end of the longitudinal shaft 62. This shaft is mounted to rotate in bearings in suitable front and rear brackets 63, 64 which are fixed to and upstand from the base 65 of said main framework.

Fixed on the rear end of the shaft 62 there is a bevel gear wheel 66 which is in mesh with, and drives, a bevel gear wheel 67 which is fixed on the lower end of the vertical shaft 68. This shaft is mounted to rotate in the upper and lower bearings of a bracket 69 which is attached to the vertical side plate 57.

Fixed to the upper end of the shaft 69 there is a bevel pinion 70, which is in mesh with, and drives, a bevel gear wheel 71 which is fixed on the shaft 72. This shaft 72 is mounted in rotate in transversely aligned bearings in the main frame side plates 57 and 58.

Fixed on the shaft 72 there is a cylinder 73 of a selected circumference and which is provided, at its end, with the radial outwardly extended pins 74 arranged in series around the drum and spaced an equal distance apart. There is a record-receiving element 75, best shown in Figures 6, 10 and 11, and which is provided with marginal holes 76 through which said pins engage to move said record-receiving element as the cylinder rotates. Thus by varying the ratio of the worm gear 61 relative to its pinion 60 and by varying the ratio of the pinions 66, 70 relative to the bevel gears driven by them any desired vertical scale on the record-receiving element 75 may be obtained to correspond to the depth of the well.

Figure 8:
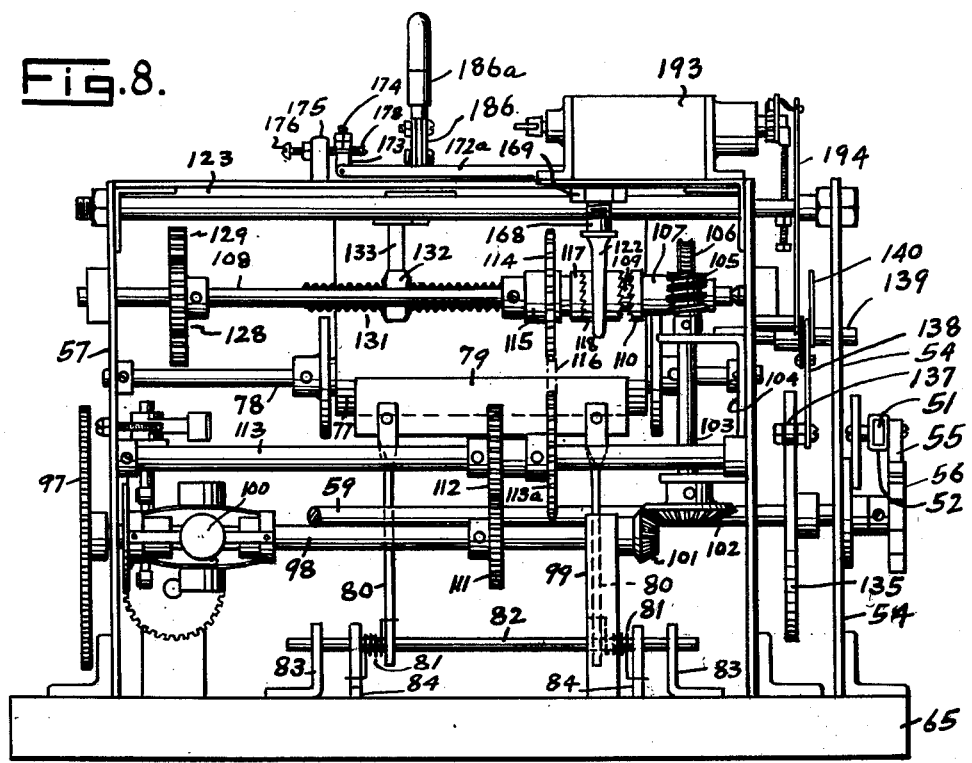
Fig. 8 is a front elevational view with the governor controlled motor removed.

The record-receiving element is wound into a supply roll 77 which is mounted on a transverse shaft 78. This shaft has end bearings in the side plates 57, 58, as best shown in Figure 8.

Figure 9:
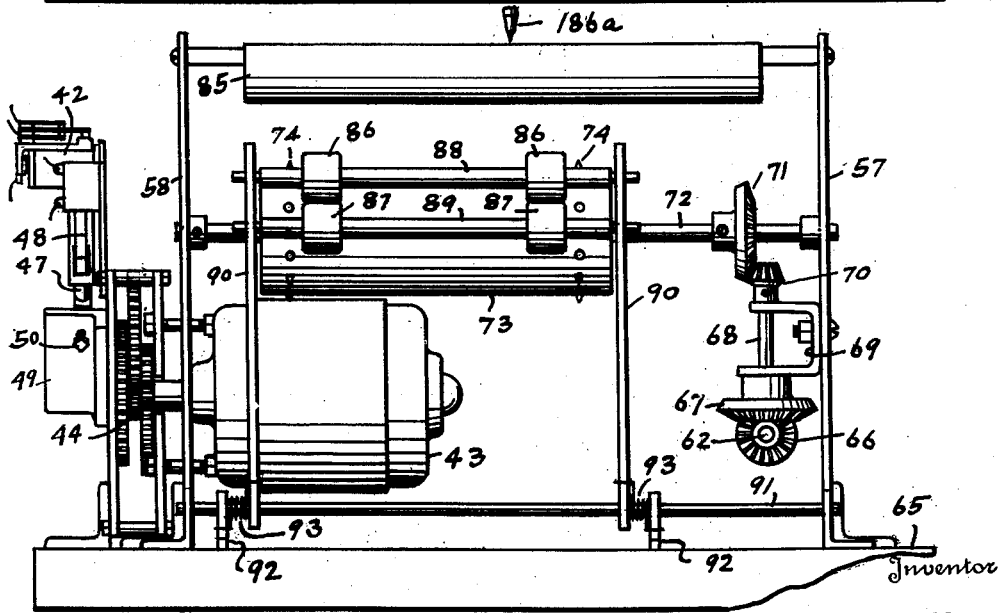
Figure 9 is a rear elevational view.

There is a transverse friction plate 79 which is in frictional engagement with the supply roll 77. It is fastened to the upper ends of the arms 80, 80 and is maintained in frictional engagement with said roll by the springs 81, 81. The lower ends of the arms 80 have bearings on a transverse rod 82 which is mounted in bearings in the upper ends of the brackets 83, 83 and 84, 84 which, in turn, are fastened to the base 65 of the main frame. The springs 81 are coiled around the rod 82. One end of each spring is outwardly turned and rests against the corresponding bracket 84 and its other end is inwardly turned and rests against the corresponding arm 80. The record-receiving element moves over the table 85 and around the cylinder 73 and passes then out between the front upper and lower delivery rollers 86 and 87 which are fixed on upper and lower shafts 88 and 89, as best shown in Figures 9, 10 and 11. The ends of the shafts 88 and 89 are mounted to rotate in the upstanding side arms 90, 90 whose lower ends have bearings on the transverse rod 91. The ends of this rod are supported by the side plates 57, 58 and also by brackets 92, 92 upstanding from the base 65. Tension springs 93, 93 are coiled around the rod 91 with one end of each spring outwardly turned and bearing against the corresponding bracket 92 and the other end thereof inwardly turned and bearing against the corresponding arm 90 whereby the delivery rolls are held in yielding contact with the cylinder 73.

At the front of the recording machine there is a motor 94 which is mounted on the base 65. Fixed on the shaft of this motor there is a spur gear 96 which is in mesh with, and drives, a larger spur gear 97. This spur gear 97 is fixed on a transverse shaft 98 which has a bearing in the plate 57 and also in the bracket 99 which upstands from the base 65. The speed of the motor 94 is controlled by a conventional governor 100 which is mounted on the shaft 98. On the other end of the shaft 98 there is fixed a bevel gear 101 which is in mesh with, and drives, a bevel gear 102 fixed on the lower end of the vertical shaft 103. This vertical shaft rotates in suitable bearings in a bracket 104 which is fixed to the upstanding side plate 58. Fixed to the upper end of the shaft 103 there is a worm 105 which is in mesh with, and drives, the worm gear 106 which is fixed on a clutch sleeve 107. This clutch sleeve 107 is held in position, and is revolvable, on a transverse shaft 108 by the keyway sleeve 109 which is fixed on the shaft 108. The inner end of the clutch sleeve 107 is formed into an annular clutch jaw 110. The clutch sleeve 107 and the worm gear 106 being fixed together rotate in one direction only but the shaft 108 and the keyway sleeve 109 may revolve in either direction.

Fixed on the shaft 98 there is a spur gear 111 which is in mesh with, and drives, a spur gear 112 which is fixed on the transverse shaft 113. This shaft is mounted to rotate in suitable bearings in the upstanding side plates 57, 58 of the main frame and has a sprocket wheel 113a fixed thereon. This sprocket wheel 113a is aligned with a corresponding sprocket wheel 114 which is mounted on a clutch sleeve 115 which, in turn, is rotatably mounted on the shaft 108. A sprocket chain 116 operates over these aligned sprocket wheels and transmits rotation from the former to the latter. The inner end of the clutch sleeve 115 is formed with a clutch jaw 117.

There is a clutch member 118 which is slidably mounted on the keyway sleeve 109 with inwardly extended pins fixed thereto and which slide in a keyway 120 of the keyway sleeve 109. The clutch member 118 is formed at its ends into clutch jaws and when said clutch member is shifted into clutching relation with the clutch jaw 110, the shaft 108 will be driven in the direction of rotation and at the rate of speed of the worm gear 106 and, when the said clutch member 118 is shifted into engagement with the clutch jaw 117, the shaft 108 will be driven in the direction of rotation and at the same rate of speed as the sprocket wheel 114.

The clutch member 118 has an external annular groove 121 therearound, as shown in Figure 11, and there is a yoke 122 which is mounted to rotate on a vertical axis in a cross-plate 123 carried by the main frame. This yoke has the upper and lower laterally extending arms 124, 125 which carry the pins 126, 127 that project into said groove 121 whereby, upon rotation of the yoke, the clutch member 118 may be shifted into either of said clutching relations hereinabove referred to.

Fixed on the shaft 108, there is a spur gear 128 which is in mesh with, and drives, a larger spur gear 129, which is fixed on the screw shaft 130. This screw shaft has transversely aligned bearings in the upstanding side plates 57, 58, as best shown in Figure 6, and has an externally threaded portion 131 on which the nut 132 is threaded. Fixed to the nut 132, there is an upstanding arm 133 which is connected with, and supports, the carriage 134.

In the operational cycle, the direction of movement of the carriage along the shaft 130 is controlled by the clutch member 118; that is, when said clutch member is shifted into engagement with the clutch jaw 110, the shaft 108 will be driven through the worm 105 and worm gear 106 at a very slow rate of speed and the shaft 130 will be driven through the gearing 128, 129 at a slow rate of speed; but, upon shifting of the clutch member 118 into engagement with the clutch jaw 117, the shaft 108 will be driven through the sprocket wheel 114 at a fast rate of speed and, accordingly, the shaft 130 will be driven through the gearing 128, 129 at a fast rate of speed. Therefore, the carriage 134 will move to the right comparatively slowly but will be rapidly returned in a left direction to the initial starting point. It may be here stated that the operation of the clutch member 118 is controlled through the yoke 122 which is coordinated mechanically with the measuring device previously explained. The carriage is also supported and guided by the transverse track 134a.

Figure 7:
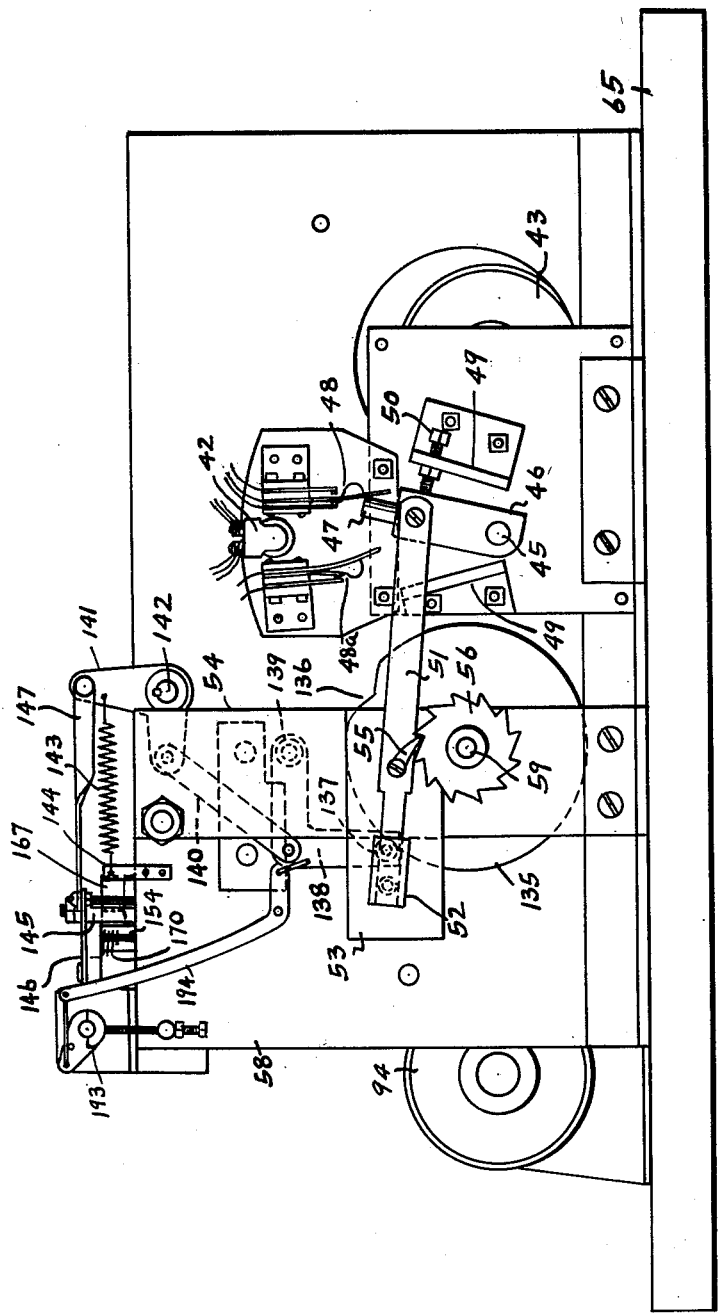
Figure 7 is a side view thereof.

Fixed on the shaft 59, there is a disc 135, as best shown in Figures 7 and 8. This disc is preferably located between the upstanding side frame 54 and the side plate 58, as shown in Figure 8. The disc 135 is provided with a marginal notch 136 and, riding on the margin of the disc 135, there is a roller 137 which is mounted on the lower end of the depending arm of a bell crank 138. This bell crank is pivotally mounted on a transverse shaft 139 which extends transversely through the auxiliary side frame 54 and the upstanding side plate 58. There is a toggle link 140 which is pivotally connected, at its lower end, to the bell crank 138 and, at its upper end, to the laterally extended arm of a bell crank 141. This bell crank 141 is fixed to the end of the transverse shaft 142 which is mounted to rotate in suitable transversely aligned bearings in the upstanding side plates 57 and 58. A pull spring 143 is connected at one end to the upwardly extended arm of the bell crank 141 and said spring is connected at the other end to an adjustable arm 144 which is attached to, and upstands from, the upstanding side plate 58. Accordingly, the roller 137 is held in yielding contact with the margin of the disc 135 by the pull of the spring 143 on the bell cranks 141, 138 and the interconnecting link 140.

The disc 135, being fixed on the same shaft as the ratchet 56, will rotate with said ratchet and the roller 137 will ride around the margin of said disc and will drop into the notch 136 with each revolution of the disc. This will allow the bell crank 138 to move downwardly and the upstanding arm of the bell crank 141 to move forwardly under the influence of the pull of the spring 143 and thus causing a partial rotation of the shaft 142.

Pivotally mounted on the upper end of a fixed post 145, there is a bell crank 146 which is fixed to and upstands from the transverse plate, or table, 123. A connecting rod 147 is pivotally connected, at one end, to the upstanding arm of the bell crank 141 and is pivotally connected, at its other end, to the laterally turned arm of the bell crank 146. The other arm of the bell crank 146 is pivotally connected to one end of a connecting rod 148. In the other end of the connecting rod 148, there is an elongated slot 149 and a pin 150 works through said slot and is fixed to the end of the arm 151 underneath. A slide plate 152 is adjustably mounted on the connecting rod 148. It has an elongated slot 152a to receive a clamp screw 153 which is screwed into the rod 148. One end of this slide plate extends over the adjacent end of the slot 149 and by loosening the screw 158 the slide plate 152 can be adjusted so as to, in effect, lengthen or shorten the slot 149 and the screw 153 may then be tightened to clamp the slide plate 152 securely to the rod 148.

It will be noted that the arm 151 is pivotally mounted on the upper end of the post 154 which is fixed to the platform 123 and the connecting rod 148 is connected to one end of said arm 151. The other end of the arm 151 is provided with deepnotch 155 through which the screw pin 166 extends loosely and this screw pin is attached, eccentrically, to the collar 167. Extending through the platform 123, there is a sleeve bearing 168 which is held in position by the upper and lower lock nuts 169 and the shank of the clutch yoke 122 works through this sleeve bearing 163 and the collar 167 is securely fixed thereto. Around the post 154, there is a coil spring 170, one end of which is attached to the post and the other end of which is connected to the pivotally mounted arm 151. On the cross-plate, or platform, 123, there is a fixed bracket 171 on which a trigger 172 is pivotally mounted.

The bracket 171 is at right angular relation to the pivotal arm 151 so that the arm may be engaged under the dog of said trigger and thereby held until released, as hereinafter explained.

As best shown in Figure 6, there is a rod 172a pivotally connected, at one end, to said trigger and whose other end is pivotally connected to one end of the arm 173 that is pivotally mounted on post 174 which upstands from the plate, or platform, 123. This construction is also shown in Figure 10. Referring again to Figure 6, there is an upstanding post 175, preferably square in cross-section and which upstands from said plate, or platform, 123. Threaded through the post 175 there is an adjusting screw 176 which may be adjusted so as to regulate the range of travel of the arm 173 thereby controlling the depth that the trigger 172 may drop over the pivotally mounted arm 151.

The trigger is held under tension by means of a pull spring 177 which is attached, at one end, to the pivotally mounted arm 173 and at its other end to the post 175. Threaded through the opposite end of the arm 173 there is an adjusting screw 178 which is arranged to contact with a bracket 179 upstanding from the carriage 134 thus raising the dog of the trigger 172 through the connections just described and thus allowing the pivotally mounted arm 151 to resume its normal position, which normal position will be assumed under the influence of the spring 170.

The shaft 142 is provided with a longitudinal keyway 180 of somewhat greater length that the width of, and arranged in front of, the record-receiving element 75. Loosely mounted on the inner, or rear, end, of the carriage 134 there is a sleeve 181 having a key 182 extending into the longitudinal keyway 180 of said shaft so that the sleeve 181 will move longitudinally with the carriage as the carriage is advanced with respect to the shaft 130.

Attached to the sleeve 181 there is the arm 184 whose free end carries a pivoted dog 185 which projects into a notch, or recess, 185a in a depending web of the stylus arm 186.

As the shaft 142 is partially rotated by the action of the bell crank 141, affixed to its end, the pin keyed sleeve 181 moves in the same direction, causing the arm 184 and dog 185 to press the stylus arm 186 downwardly allowing the stylus 186a to make a dot on the record-receiving element at the scale depth of the well. As the arm 184 releases the stylus arm 186, said arm is returned to its original position by the tension of the spring 187, one end of which is attached to an upstanding bracket 188 on the carriage and whose other end is connected to the forward end of said arm 186, as shown in Figure 10.

At the time the stylus 186a is brought into contact with the record-receiving element 75 through the action of the arm 184, the carriage 134 has been traveling at a slow rate of speed from left to right by the rotation of the screw shaft 130. At that instant, the direction of rotation of the screw shaft 130 is reversed and set in motion at a much faster rate of speed by shifting the clutch member 118 from its right hand driven position to its left hand driving position. This is accomplished by the linkage consisting of the arms 147, 146, 148 transmitting movement of bellcrank 141 at right angles to arm 151 which in turn causes the eccentric screw pin 166 on the collar 167 to turn the clutch yoke 122 sliding the clutch member 118 from contact with the jaw 110 into contact with the jaw 117. The clutch member 118 is held in this position by the outer end of the pivotal arm 151, as shown in Figure 6, coming under the dog of the trigger 172 where it remains until the carriage 134 has returned the stylus 186a to the left margin of the record-receiving element 75 at which time the bracket 179 contacts the adjusting screw 178 allowing pivotal arm 151 to return to its normal position through the tension of spring 170, as shown in Figures 7 and 11. This movement of the arm 148 is instantaneous and said arm is returned to its original, or initial position, the pin 150 sliding relative to the slot 149 in said arm 148.

To briefly recapitulate the operation of the apparatus the knurled measuring wheel 24 rides in frictional contact wih the adjacent face of the kelly 4 and the downward movement of the kelly causes the rotation of said wheel which is connected with the commutator 33. Each revolution of the wheel 24, in the present illustration, represents six inches of downward movement of the kelly and produces six electrical impulses which are transmitted to the recording device through the conductors 17. These impulses act upon the lifting coil of a latch type, double pole, double throw, relay which serves as a reversing switch for the motor 43. This motor, through its connecting mechanism, hereinabove described, moves the record-receiving element 75 intermittently forwardly with every inch of kelly travelled or new hole made. The cycle begins with the carriage 134 in position with the stylus 186a over the left margin of said record-receiving element. As drilling progresses the carriage is driven at a fixed rate of speed by the motor 94, and its connecting gear train, from left to right until such time as the drill bit has made the last inch of the foot drilled when the stylus is allowed to drop into contact with the record-receiving element making a dot on said element and instantly resuming its raised position. At the instant of contact with said record-receiving element the direction of travel of the carriage is reversed at a fast rate of speed and said carriage, and the stylus, are quickly returned to initial position a the beginning of the cycle where the carriage movement is again reversed to begin another cycle. This operational cycle is continuous during the progress of the drilling.

In drilling through soft formation, the drill stem will descend rapidly and the dots made by the stylus 186 will be at, or near, the left side of the record-receiving element; but, in drilling hard formation, the progress of the drill stem downwardly will be slower and, since the carriage 134 moves at a constant rate of speed from left to right, the dots made by said stylus on the record-receiving element will be further to the right; thus a log will be made on the record-receiving element, as indicated in Figure 6, indicating the varying densities of the strata pierced as well as the depth thereof.

The electrical circuit is shown partially in Figure 1 and diagrammatically in Figure 15.

Current is supplied from any suitable source, as 189, through the conductors 36, 36a, and the current may be completed, or broken, through the main switch 192, as is illustrated in said figures.

Installed at a convenient place on the framework, there is a conventional counter 193 which is actuated by a lever 194 which is pivotally mounted on the upstanding side plate 58. One end of this lever is operatively connected with the bellcrank 138 and the other end of the lever is operatively connected with the actuating shaft of the counter so that the counter is operated in harmony with the rotation of the disc 135 so that the footage of the well will be shown by the counter as drilling progresses.

Generally stated the logging machine herein above described has been designed for making a point by point graph of two related mensurable occurrences, the first coordinate of each point showing directly the value of the first of the two occurrences at the end of arbitrary intervals, the second coordinate point showing the increment of the second occurrence associated with the concomitant interval related to the first occurrence.

The drawings and description are illustrative merely, as it is contemplated that mechanical changes and adaptations may be made therein, while the broad principle of the invention is defined by the appended claims.

What I claim is:

1. A well logging machine for use in connection with rotary drilling equipment having a rotatable drill stem, which comprises, means holding and advancing a movable record receiving element, said means connecting with said rotary drilling equipment in a manner to advance said record receiving element at a rate of speed determined by the speed of the downward movement of said drill stem, a stylus movably positioned above and adapted to mark said record receiving element, a power driven screw shaft and gearing connecting the latter with said stylus, a movable clutch and gearing connecting said screw shaft with a driving means to rotate the latter at selected rates of speed, linkage and gearing connecting said clutch with said means for holding and advancing said record receiving element, said linkage and gearing operative with said advancing means to move said movable clutch and reverse the direction of rotation of said screw shaft and the direction of movement of said stylus, and providing thereby a marked record of the time consumed for a predetermined increment of downward movement of said drill stem.

2. A well logging apparatus for use in connection with rotary drilling equipment having a rotatable drill stem, which comprises in combination, automatic means holding and advancing a movable record receiving element, said automatic means including an electrical commutator, an electrical relay, a motor, and gearing and linkage moving said record receiving element intermittently forward responsive to predetermined intervals of descent of said drill stem, a movable stylus positioned above and adapted to mark said record receiving element, a rotatable power driven screw shaft and a stylus carriage engageable therewith, said screw shaft and stylus carriage positioned to move said stylus transversely of the said record receiving element, a rotatable notched disc and additional linkage and gearing connecting said automatic means holding and advancing said record receiving element with a movable clutch, said movable clutch engaging said screw shaft in alternative positions and operative to connect power driving means with said screw shaft and thereby permit the reversal of the direction of rotation of said shaft responsive to said notched disc and linkage, said driving means geared to rotate shaft at selected rates of speed and providing thereby an automatically marked continuous recording of time consumed for each predetermined interval of descent of said drill stem.

3. The apparatus of claim 2 further characterized in that said movable clutch engages said screw shaft in one position to connect said driving means therewith and rotate said shaft in one direction at a fixed selected rate of speed and said notched disc and linkage holds said movable clutch in a manner to engage said screw shaft in a second position and connect it with said driving means to effect the reversal of the direction of rotation of said shaft and the simultaneous rotation of the shaft at a different rate of speed, whereby to effect a corresponding change in the rate of movement of said stylus carriage in its transverse movement.

4. A well logging device for use in connection with the drill stem of rotary drilling equipment and comprising in combination, automatic electrically controlled means including a power source, a mechanically driven commutator, an electrical relay, and a motor, with linkage and gearing connected and arranged therewith effecting the holding and intermittent advancing of a movable record receiving element, said automatic means advancing the latter for predetermined increments of downward movement of said drill stem, a stylus and stylus carriage movably positioned above said record receiving element and a rotatable power driven screw shaft connecting with said stylus carriage to move said stylus transversely of said record receiving element at selected rates of speed, a movable clutch and gearing selectively connecting said screw shaft with driving means to effect the rotation of said shaft, linkage and gearing connective between said movable clutch and said automatic means for advancing said record receiving element, with said linkage and gearing operating responsive to said advancing means to move said clutch at the termination of each predetermined increment of downward movement of said drill stem, the movement of said clutch controlling the direction of rotation of said screw shaft and the direction of the transverse movement of said connecting stylus, said driving means moving said screw shaft through said clutch and gearing in one direction away from an initial starting point at a fixed relatively slow rate of speed, and said driving means moving said screw shaft in the reverse direction through said clutch and gearing at an accelerated speed effecting the return of said stylus to the initial starting point upon the movement of said clutch, additional means associated with said automatic advancing means holding said stylus inactive above said record receiving element until the latter moves said predetermined increment, said additional means then effecting the marking of said element and the automatic logging of time utilized for said predetermined increment of downward movement of said drill stem.

5. The well logging device of claim 4 further characterized in that a rotatable knurled nut is held in frictional contact with a portion of said rotary drilling equipment, and mechanical linkage connecting with the axis of rotation of said knurled nut connects with and operates said electrical commutator whereby to effect electrical impulses in operating said relay and intermittently operating said motor and advancing said record receiving element responsive to the downward movement of said drill stem.

HERSCHELL R. SCIVALLY.

REFERENCES CITED

The following references are of record in the file of this patent:

UNITED STATES PATENTS

| Number | Name | Date |
|---|---|---|
| 2,287,819 | Nichols | June 30, 1942 |
| 2,330,752 | Sikes | Sept. 28, 1943 |
| 2,357,051 | McLaine | Aug. 29, 1944 |
| 2,365,014 | Silverman et al. | Dec. 14, 1944 |
| 2,390,178 | Rutherford | Dec. 4, 1945 |